(12) United States Patent
Berestov et al.

(10) Patent No.: US 9,261,966 B2
(45) Date of Patent: Feb. 16, 2016

(54) CLOSE RANGE NATURAL USER INTERFACE SYSTEM AND METHOD OF OPERATION THEREOF

(71) Applicant: Sony Corporation, Tokyo (JP)

(72) Inventors: Alexander Berestov, San Jose, CA (US); Jun Yokono, Tokyo (JP)

(73) Assignee: Sony Corporation, Tokyo (JP)

( * ) Notice: Subject to any disclaimer, the term of this patent is extended or adjusted under 35 U.S.C. 154(b) by 105 days.

(21) Appl. No.: 13/973,798

(22) Filed: Aug. 22, 2013

(65) Prior Publication Data

US 2015/0054740 A1 Feb. 26, 2015

(51) Int. Cl.
| | |
|---|---|
| *G06F 3/033* | (2013.01) |
| *G09G 5/08* | (2006.01) |
| *G06F 3/01* | (2006.01) |
| *G06F 3/00* | (2006.01) |

(52) U.S. Cl.
CPC ............... *G06F 3/017* (2013.01); *G06F 3/005* (2013.01)

(58) Field of Classification Search
CPC ....... G06F 3/005; G06F 3/017; G06F 3/0304; G06F 3/0487; G06K 9/00335; G06K 9/00355; G06K 9/00375
USPC .................................................. 345/157, 158
See application file for complete search history.

(56) References Cited

U.S. PATENT DOCUMENTS

| | | | |
|---|---|---|---|
| 5,454,043 A | 9/1995 | Freeman | |
| 6,299,308 B1 | 10/2001 | Voronka et al. | |
| 7,145,562 B2 | 12/2006 | Schechter et al. | |
| 7,686,451 B2 | 3/2010 | Cleveland | |
| 8,259,161 B1 | 9/2012 | Huang et al. | |
| 8,395,658 B2 | 3/2013 | Corson | |
| 2005/0134706 A1* | 6/2005 | Moon et al. | 348/236 |
| 2007/0159455 A1* | 7/2007 | Lin | 345/156 |
| 2011/0154266 A1* | 6/2011 | Friend et al. | 715/863 |
| 2011/0175920 A1* | 7/2011 | Ieperen | 345/473 |
| 2012/0176314 A1 | 7/2012 | Jeon | |
| 2012/0229380 A1 | 9/2012 | Silvester | |
| 2012/0249429 A1* | 10/2012 | Anderson et al. | 345/173 |
| 2012/0284012 A1 | 11/2012 | Rodriguez et al. | |
| 2013/0102324 A1* | 4/2013 | Qiu et al. | 455/456.1 |
| 2013/0182897 A1 | 7/2013 | Holz | |
| 2014/0125813 A1* | 5/2014 | Holz | 348/169 |

FOREIGN PATENT DOCUMENTS

WO 2013012335 A1 1/2013

OTHER PUBLICATIONS

International Search Report for PCT Application No. PCT/US2014/051452 dated Dec. 18, 2014.

* cited by examiner

*Primary Examiner* — Stephen Sherman
(74) *Attorney, Agent, or Firm* — Ishimaru & Associates LLP (57) ABSTRACT

A natural user interface system and method of operation thereof including: a display device having a display screen and a display device camera; a mobile device having a mobile device camera, an optical axis of the mobile device camera positioned at an angle to an optical axis of the display device camera; wherein: the mobile device includes a first device pairing module for pairing the mobile device with the display device; the mobile device camera and the display device camera are for: detecting a user's hand, and determining posture and movement of the user's hand; and the display device includes a motion translation module for translating the posture and movement of the user's hand into a gesture for controlling an element of a user interface on the display screen.

20 Claims, 3 Drawing Sheets

CLOSE RANGE NATURAL USER INTERFACE SYSTEM AND METHOD OF OPERATION THEREOF

TECHNICAL FIELD

The present invention relates generally to a natural user interface system, and more particularly to a system for a close range natural user interface system.

BACKGROUND ART

To a large extent, humans' interactions with electronic devices, such as computers, tablets, and mobile phones, requires physically manipulating controls, pressing buttons, or touching screens. For example, users interact with computers via input devices, such as a keyboard and mouse. While a keyboard and mouse are effective for functions such as entering text and scrolling through documents, they are not effective for many other ways in which a user could interact with an electronic device. A user's hand holding a mouse is constrained to move only along flat two-dimensional (2D) surfaces, and navigating with a mouse through three dimensional virtual spaces is clumsy and non-intuitive. Similarly, the flat interface of a touch screen does not allow a user to convey any notion of depth.

Using three-dimensional (3D, or depth) cameras, or two cameras on one device, gesture-based 3D control of electronic devices can be achieved. However, current methods of allowing 3D control using the user's body or hands rely on large gestures, lengthy calibration procedures, or specialized equipment that is expensive or unavailable.

Thus, a need still remains for a simpler solution for providing and operating a close range natural user interface. In view of the complexity and cost of current solutions, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a natural user interface system including: providing a display device having a display screen and a display device camera; providing a mobile device having a mobile device camera, an optical axis of the mobile device camera positioned at an angle to an optical axis of the display device camera; pairing the mobile device with the display device; detecting a user's hand; determining posture and movement of the user's hand; and translating the posture and movement of the user's hand into a gesture for controlling an element of a user interface on the display screen.

The present invention provides a natural user interface system, including: a display device having a display screen and a display device camera; a mobile device having a mobile device camera, an optical axis of the mobile device camera positioned at an angle to an optical axis of the display device camera; wherein: the mobile device includes a first device pairing module for pairing the mobile device with the display device; the mobile device camera and the display device camera are for: detecting a user's hand, and determining posture and movement of the user's hand; and the display device includes a motion translation module for translating the posture and movement of the user's hand into a gesture for controlling an element of a user interface on the display screen.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGS. Similarly, although the views in the drawings for ease of description generally show similar orientations, this depiction in the FIGs. is arbitrary for the most part. Generally, the invention can be operated in any orientation.

The same numbers are used in all the drawing FIGs. to relate to the same elements. The embodiments may be numbered first embodiment, second embodiment, etc. as a matter of descriptive convenience and are not intended to have any other significance or provide limitations for the present invention.

For expository purposes, the term "horizontal" as used herein is defined as a plane parallel to the plane or surface of the floor of the user's location. The term "vertical" refers to a direction perpendicular to the horizontal as just defined. Terms, such as "above", "below", "bottom", "top", "side" (as in "sidewall"), "higher", "lower", "upper", "over", and "under", are defined with respect to the horizontal plane, as shown in the figures. The term "on" means that there is direct contact between elements. The term "directly on" means that there is direct contact between one element and another element without an intervening element.

The term "active side" refers to a side of a die, a module, a package, or an electronic structure having active circuitry fabricated thereon or having elements for connection to the active circuitry within the die, the module, the package, or the electronic structure.

The term "processing" as used herein includes deposition of material or photoresist, patterning, exposure, development, etching, cleaning, and/or removal of the material or photoresist as required in forming a described structure.

Figure 1:
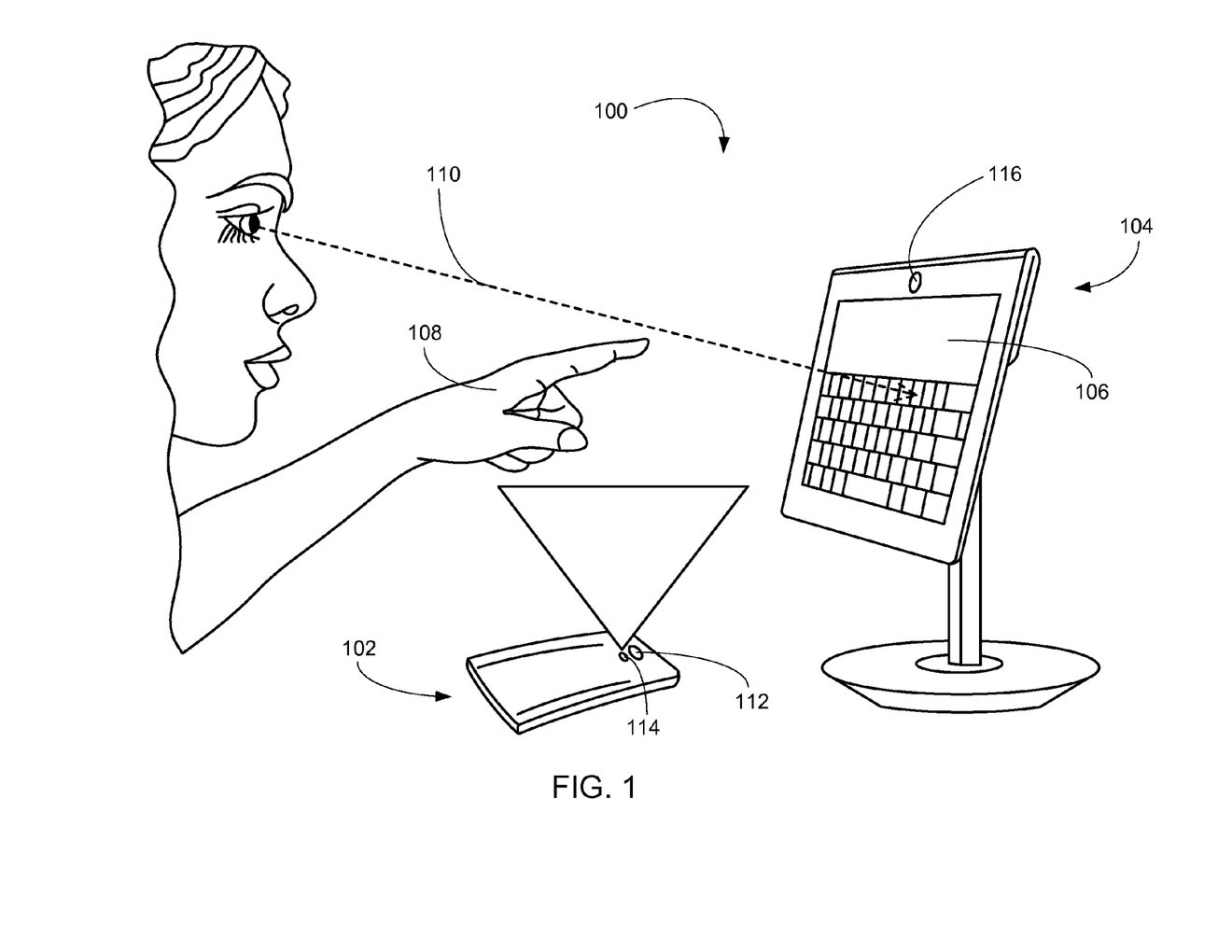
FIG. 1 is a natural user interface system in an embodiment of the present invention.

Referring now to FIG. 1, therein is shown a natural user interface system 100 in an embodiment of the present invention. The natural user interface system 100 includes a mobile device 102 and a display device 104. Shown pointing towards a display screen 106 of the display device 104 is a user's hand 108. The user's face is also shown, with an eyeline vector 110, depicted as a dotted line, showing where the user is looking on the screen.

The mobile device 102 is shown in front of the display device 104 in a face-down orientation, but it is understood that the mobile device 102 could also be face-up. The face of the mobile device 102 is defined as the main display screen of the mobile device 102, which is not visible in this example. The mobile device 102 has a mobile device camera 112 which faces up when the mobile device 102 is in a face-down orientation. An optical axis of the mobile device camera 112 is defined as the direction the mobile device camera 112 faces or "looks." In other words, the center of the field of view of the mobile device camera 112 can be the optical axis of the mobile device camera 112. The mobile device camera 112 is a video capture mechanism. The mobile device camera 112 can be capable of capturing two-dimensional (2D) or three-dimensional (3D) images. The mobile device 102 can be any of a variety of electronic devices such as a smartphone, a feature phone, a WiFi-enabled camera, a tablet, or any device having a camera, processing capability, and wireless capability.

The mobile device 102 also has a flash light 114 for illuminating objects in front of the mobile device camera 112 when ambient light is insufficient to distinguish what is in front of the mobile device camera 112. For example, when a darkness condition is determined (not enough light to obtain a usable image, for example), the flash light 114 can be activated and operate as a constant source of light for illumination or as a flash when taking pictures with the mobile device camera 112. Light emitted from the flash light 114 is represented by the triangle above the flash light 114 as an example only. The flash light 114 can operate using any lighting technology such as incandescent, light emitting diode (LED), fluorescent, halogen, or other type of light.

The display device 104 is paired with the mobile device 102 through a wireless connection protocol such as WiFi, Bluetooth, a cellular data protocol, or other wireless protocol, and is shown facing the mobile device 102. For example, a first device pairing module of the mobile device 102 can connect to a second device pairing module of the display device 104. The first device pairing module and the second device pairing module can send relevant data back and forth between the mobile device 102 and the display device 104 as necessary. The display device 104 can have the display screen 106 as the main viewing screen for the natural user interface system 100.

The display device 104 has a display device camera 116 that preferably is facing the same direction as the display screen 106 of the display device 104. An optical axis of the display device camera 116 is defined as the direction the display device camera 116 faces or "looks." In other words, the center of the field of view of the display device camera 116 can be the optical axis of the display device camera 116. The display device camera 116 can be capable of capturing two-dimensional (2D) or three-dimensional (3D) images. The display device 104 can be a device such as a laptop computer, an all-in-one desktop computer, a monitor connected to a desktop computer, a tablet, a TV, a smartphone, or other device capable of wireless connection including a device that is the same as the mobile device 102. In this example, the display device 104 is shown as a tablet computer mounted on a stand, but it is understood that this is for example only.

The mobile device 102 and the display device 104 can contain many modules capable of performing various functions such as a shape detection module coupled to the first device pairing module, a motion tracking module coupled to the shape detection module or the first device pairing module, and a motion translation module coupled to the motion tracking module. The mobile device 102 only, the display device 104 only, or the combination of the mobile device 102 and the display device 104 can run some or all of the modules simultaneously or in parallel.

The mobile device camera 112 and the display device camera 116 are positioned to have fields of view that are overlapping and with their respective optical axes at an angle to each other. For example, the optical axes of the mobile device camera 112 and the display device camera 116 can be roughly orthogonal to each other, as opposed to cameras which are pointed in parallel directions as with camera systems used for stereoscopic three-dimensional cameras. In other words, the mobile device camera 112 and the display device camera 116 have optical axes pointed in different directions so as to have overlapping fields of view in order to capture images of anything in the overlapping fields of view from different angles relative to the object in the overlapping fields of view.

In this example, the user's hand 108 is within the overlapping fields of view of the mobile device camera 112 and the display device camera 116. Because the mobile device camera 112 and the display device camera 116 see very different views of the user's hand 108, it is possible to obtain relevant three-dimensional shape, posture, position, and motion information about the user's hand 108.

For example, the mobile device camera 112 in conjunction with a shape detection module of the mobile device 102, coupled to the first device pairing module, can image the bottom of the user's hand 108 and easily detect shape or posture (such as pointing, grasping, flat, etc.). The mobile device camera 112 in conjunction with a first device motion tracking module, coupled to the shape detection module, can detect forward and backwards motion (relative to the display screen 106 of the display device 104) and side-to-side motion.

The display device camera 116 in conjunction with a second device motion tracking module, coupled to the second device pairing module, can image the front of the user's hand 108 and can easily detect motion in the up-and-down and side-to-side directions. The display device camera 116 can also detect shape or posture of the user's hand 108 from the front to combine with and refine the detection of the shape or posture of the user's hand 108 from the mobile device camera 112. Through triangulation and correlation techniques, such as correlating the side-to-side motions from the mobile device camera 112 and the display device camera 116, the natural user interface system 100 running on the mobile device 102, the display device 104, or both the mobile device 102 and the display device 104 in parallel can calculate three-dimensional shape, posture, position, and motion information without the use of depth mapping or stereoscopic techniques. For example, data from the first device motion tracking module and the second device motion tracking module can be combined by a motion correlation module, which can run on the mobile device 102, the display device 104, can be split between both the mobile device 102 and the display device 104, or can run in parallel on both the mobile device 102 and the display device 104 with results checked for accuracy.

For illustrative purposes, the mobile device camera 112 and the display device camera 116 are described as capturing two-dimensional images for ease of processing, but it is understood that extra precision in measurements can be calculated if the mobile device camera 112, the display device camera 116, or both capture three-dimensional images. Capturing and processing three-dimensional images may be more computationally intensive, making capturing and processing of two-dimensional images preferable in order to speed detection and processing while saving battery life for any mobile devices involved.

Also for example, the mobile device 102 and the display device 104 can be equipped with gyroscopes, a compass, and/or accelerometers to determine the orientation of the mobile device 102 and the display device 104 at any time. This allows the mobile device 102 to be placed at an arbitrary angle relative to the display device 104 as long as the mobile device camera 112 has a field of view that is overlapping and at some angle to that of the display device camera 116.

For example, if both the mobile device 102 and the display device 104 are equipped with a compass (electronic or analog) and a gyroscope, the viewing orientations can be synchronized based on the compass readings and the gyroscopes such that calibration by the user is unnecessary. A view synchronization module of the mobile device 102 or the display device 104 can operate with the compass and/or the gyroscope to synchronize the viewing angle of the mobile device 102 with the display device 104. For example, no matter the angle the mobile device 102 is placed at relative to the plane of the display screen 106 of the display device 104, the view synchronization module can adjust how an image captured by the mobile device camera 112 is processed by rotating the captured image appropriately to match or synchronize with the orientation of the mobile device 102 relative to the orientation of the display screen 106.

Also for example, if the display device 104 is equipped with a gyroscope, the angle of the display device 104 can be determined and compensated for when determining the motion of the user's hand 108. As another example, a gyroscope in the mobile device 102 can determine when the mobile device 102 is in a face-down position and the first device pairing module can automatically initiate the wireless connection to the display device 104 and initialize the natural user interface system 100 without any further interaction from the user.

It has been discovered that having both the mobile device 102 and the display device 104 equipped with gyroscopes, compasses, and/or accelerometers allows for a better user experience. Because the orientation of the mobile device 102 and the display device 104 are known at any given time, the mobile device 102 can be placed in an arbitrary orientation relative to the display device 104, obviating the need for lengthy calibration procedures or limitations of how the mobile device 102 must be placed. In addition, automatic pairing based on the orientation of the mobile device 102 can also remove the need for the user to open or operate a specific program on the mobile device 102, further simplifying the user experience; all the user would need to do is to lay the phone in a face-down orientation in order to be able to use the natural user interface system 100.

Continuing the example, the posture and movements of the user's hand 108 as determined by the mobile device camera 112 and the display device camera 116 being positioned with their respective optical axes at angles to each other and overlapping can be translated into movement on the display screen 106 of a cursor. A motion translation module, coupled to the first device motion tracking module and/or the second device motion tracking module, of the mobile device 102, the display device 104, or both, can translate the data from the first device motion tracking module and the second device motion tracking module into movement and actions of the cursor on the display screen 106 of the display device 104. Relative movement of the user's hand 108 can be translated into movements of the cursor. As a specific example, the cursor can be set to not move or appear unless the user's hand is in a specific shape such as with one finger pointing towards the screen.

Specific points on the user's hand 108 can be tracked separately with both the mobile device camera 112 and the display device camera 116 in order to determine movement in 3D space. Motion tracking to translate to movement on the display screen 106 of the cursor can also be done through vector mapping combined with a determination of distance between the mobile device 102 and the display device 104 through, for example, a vector mapping module.

The motion translation module can also operate to combine the posture and movement of the user's hand 108 to recognize gestures and translate those gestures into actions reflected by changes on the display screen 106. For example, the shape and posture of the user's hand 108 can be more accurately determined by combining data from both the mobile device camera 112 and the display device camera 116.

Combining the posture of the user's hand 108 with the movement of the user's hand 108 allows the motion translation module to recognize gestures. The gestures can be used to control the display device 104 and elements of a user interface displayed on the display screen 106 of the display device 104. For example, the detected gestures can be used to move a cursor on the display screen 106. Also for example, the detected gestures can be used to perform actions such as opening and closing applications, rotating views within an application running on the display device 104, controlling functions or cursors of any applications running on the display device 104, or otherwise controlling elements of the user interface. As another example, the detected gestures can be used to type on an on-screen keyboard on the display screen 106.

Continuing further with the example, the mobile device camera 112 has a view of the user's hand 108 with the ceiling as a background. This means that segmenting, thresholding, and otherwise determining the shape of the user's hand 108 is a simple process due to the generally clean ceiling background. The movements of the user's hand 108 on a forwards-backwards axis relative to the display screen 106 can be translated into the push of a button, for example, using the motion translation module. As another example, the flash light 114 of the mobile device 102 can be used to illuminate the user's hand 108 in low-light situations. The flash light 114 can be activated by a light detection module coupled to the first device motion tracking module, for example. The light used can be in the visible range, or can be in the infrared (IR) range for use without the risk of annoying the user with a bright light in the dark, for example.

It has been discovered that processing separate sets of images from the mobile device camera 112 and the display device camera 116 having their respective optical axes positioned at angles to each other and overlapping leads to faster and easier three-dimensional control of a natural user interface where the user's hand 108 is the main control input. For example, it is computationally much easier to determine that the user's hand 108 is pointing towards the display screen 106 from the bottoms up view of the mobile device camera 112 as compared to the display device camera 116 which only sees the user's hand 108 from the front. Splitting the components of determining movement among the separate but overlapping views allows only relevant data to be sent between the mobile device 102 and the display device 104, further lowering computational and bandwidth loading.

The display device camera 116 has a view of both the user's hand 108 and the user's face. An eyeline detection module of the display device 104 can determine the eyeline vector 110 from the user's face and eyes, and allow greater control over the movement of the cursor on the display screen 106. A movement refinement module can combine the eyeline vector 110 with the movement of the user's hand 108 as seen from the display device camera 116 to allow for precise pointing down to the millimeter level as movement of the cursor is refined based on the eyeline vector 110 from the user's face.

It has been discovered that wirelessly pairing the mobile device 102 and the display device 104 with the mobile device camera 112 and the display device camera 116 having their respective optical axes positioned at angles to each other allows the creation of a close-range user interface that can be easily set up and controlled through natural hand motions without specialized hardware. The mobile device camera 112 and the display device camera 116 can be simple 2D cameras without the complications of 3D or range camera hardware. The display device 104 can be anything from a TV to a laptop computer to a tablet, at least one of which a typical user will have, and the mobile device 102 can be a phone which just about anyone will have, so no additional hardware will need to be obtained by any user. Further, because the devices will synchronize orientation and can communicate relevant data between the mobile device 102 and the display device 104, no calibration by the user is necessary, easing set up and use of the natural user interface system 100.

Thus, it has been discovered that the natural user interface system 100 and method of operation thereof of the present invention furnishes important and heretofore unknown and unavailable solutions, capabilities, and functional aspects for simply and easily allowing users to control a close-range user interface using natural pointing gestures without specialized hardware.

Figure 2:
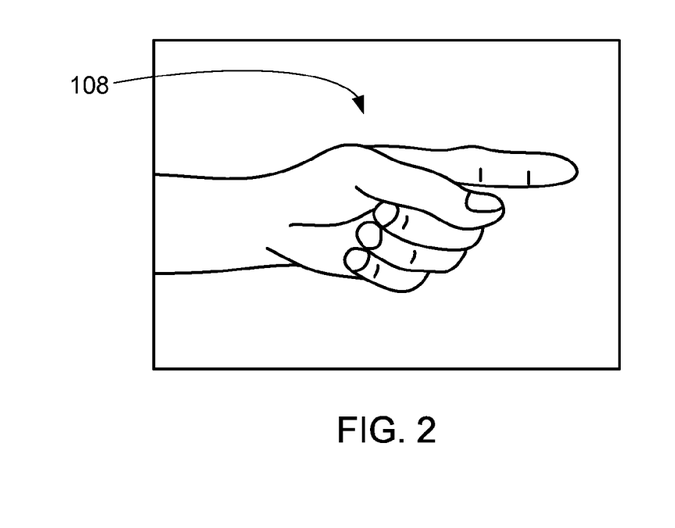
FIG. 2 is an exemplary view of the user's hand from the mobile device camera of FIG. 1.

Referring now to FIG. 2, therein is shown an exemplary view of the user's hand 108 from the mobile device camera 112 of FIG. 1. The user's hand 108 is shown in a pointing position as an example. As the mobile device camera 112 is pointing upwards, the background for the user's hand 108 is a ceiling. It is understood by one of ordinary skill in the art that a ceiling will either be largely featureless or will have a regular repeating pattern that can be easily detected such that isolation of the user's hand 108 for image processing is relatively easy as compared to picking out the user's hand 108 among the typical clutter of a MOM.

It has been discovered that placing the mobile device camera 112 to have a clear and unobstructed view of the user's hand 108, against a clean background such as a ceiling, speeds processing and simplifies calculations for interpreting the movements of the user's hand 108. The shape of the user's hand 108 (such as pointing, grasping, flat, etc.) is easily determined from the position of the mobile device camera 112 making it unnecessary for the display device 104 of FIG. 1 to have a three-dimensional camera or other specialized equipment for determining the shape of the user's hand 108; as viewed from the front, determining the shape of the user's hand 108 to a high degree of accuracy will require more information than simple edge or line detection allows. Splitting the processing between the mobile device 102 of FIG. 1 and the display device 104, each which sees a useful but different angle of the user's hand 108, decreases total processing time because calculations can be done on a smaller data set and also in parallel.

Figure 3:
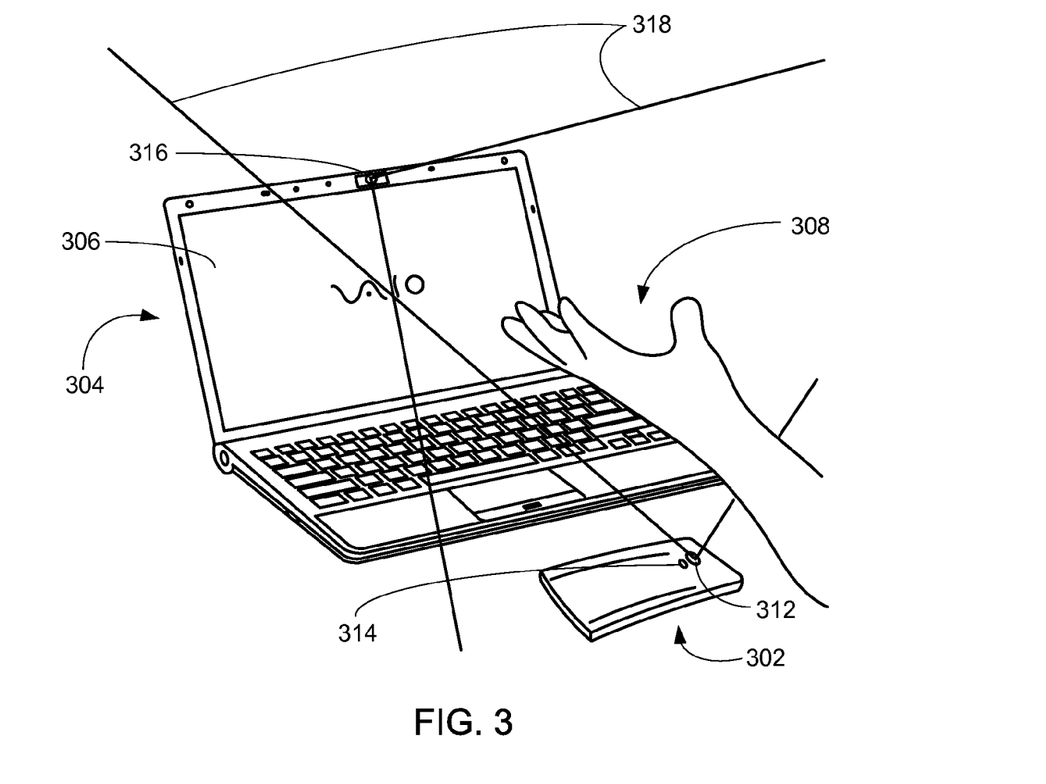
FIG. 3 is the natural user interface system in a second embodiment of the present invention.

Referring now to FIG. 3, therein is shown the natural user interface system 300 in a second embodiment of the present invention. The natural user interface system 300 includes a mobile device 302 and a display device 304. Shown in front of a display screen 306 of the display device 304 is a user's hand 308.

The mobile device 302 is shown in front of the display device 304 in a face-down orientation, but it is understood that the mobile device 302 could also be face-up. The face of the mobile device 302 is defined as the main display screen of the mobile device 302, which is not visible in this example. The mobile device 302 has a mobile device camera 312 which faces up when the mobile device 302 is in a face-down orientation. An optical axis of the mobile device camera 312 is defined as the direction the mobile device camera 312 faces or "looks." In other words, the center of the field of view of the mobile device camera 312 can be the optical axis of the mobile device camera 312. The mobile device camera 312 is a video capture mechanism. The mobile device camera 312 can be capable of capturing two-dimensional (2D) or three-dimensional (3D) images. The mobile device 302 can be any of a variety of electronic devices such as a smartphone, a feature phone, a WiFi-enabled camera, a tablet, or any device having a camera, processing capability, and wireless capability.

The mobile device 302 also has a flash light 314 for illuminating objects in front of the mobile device camera 312. For example, the flash light 314 can operate as a constant source of light for illumination or as a flash when taking pictures with the mobile device camera 312. The flash light 314 can operate using any lighting technology such as incandescent, light emitting diode (LED), fluorescent, halogen, or other type of light.

The display device 304 is paired with the mobile device 302 through a wireless connection protocol such as WiFi, Bluetooth, or a cellular data protocol, and is shown facing the mobile device 302. The display device 304 can have the display screen 306 as the main viewing screen for the natural user interface system 300.

The display device 304 has a display device camera 316 that preferably is facing the same direction as the display screen 306 of the display device 304. An optical axis of the display device camera 316 is defined as the direction the display device camera 316 faces or "looks." In other words, the center of the field of view of the display device camera 316 can be the optical axis of the display device camera 316. The display device 304 can be a device such as a laptop computer, an all-in-one desktop computer, a monitor connected to a desktop computer, a tablet, a TV, a smartphone, or other device capable of wireless connection. In this example, the display device 304 is shown as a laptop computer, but it is understood that this is for example only.

The mobile device 302 and the display device 304 can contain many modules capable of performing various functions such as a shape detection module coupled to a first device pairing module, a motion tracking module coupled to the shape detection module, and a motion translation module coupled to the motion tracking module. The mobile device 302 only, the display device 304 only, or the combination of the mobile device 302 and the display device 304 can run some or all of the modules simultaneously or in parallel.

The mobile device camera 312 and the display device camera 316 are positioned to have overlapping fields of view 318 with their respective optical axes at an angle to each other. For example, the optical axes of the mobile device camera 312 and the display device camera 316 can be roughly orthogonal to each other as opposed to cameras which are pointed in parallel directions as with camera systems used for stereoscopic three-dimensional cameras. In other words, the mobile device camera 312 and the display device camera 316 are pointed at an angle to each other such that their optical axes create overlapping fields of view 318 in order to capture images of anything in the overlapping fields of view 318 from different angles relative to the object in the overlapping fields of view 318.

In this example, the overlapping fields of view 318 are represented by two solid lines extending out from each of the mobile device camera 312 and the display device camera 316 which delineate an example of the outer extent of the respective fields of view. It is understood that the outer extent of the overlapping fields of view 318 shown is for example only, and that the outer extent of the overlapping fields of view 318 is dependent on the capabilities of the mobile device camera 312 and the display device camera 316. The user's hand 308 is shown as within the overlapping fields of view 318 of the mobile device camera 312 and the display device camera 316. Because the mobile device camera 312 and the display device camera 316 see very different views of the user's hand 308, it is possible to obtain relevant three-dimensional position and motion information about the user's hand 308.

For example, the mobile device camera 312 can image the bottom of the user's hand 308 and easily detect forward and backwards (relative to the display screen 306 of the display device 304) and side-to-side motion. The mobile device camera 312 can also detect shape or posture of the user's hand 308 (such as pointing, grasping, flat, etc.). The display device camera 316 can image the front of the user's hand 308 and can easily detect motion in the up-and-down and side-to-side directions.

The display device camera 316 can also detect shape or posture of the user's hand 308 from the front to combine with and refine the detection of the shape or posture of the user's hand 308 from the mobile device camera 312. Through triangulation and correlation techniques, such as correlating the side-to-side motions from the mobile device camera 312 and the display device camera 316, the natural user interface system 300 running on the mobile device 302, the display device 304, or both the mobile device 302 and the display device 304 in parallel can calculate three-dimensional position and motion information without the use of depth mapping or stereoscopic techniques.

Also for example, the mobile device 302 and the display device 304 can be equipped with gyroscopes, a compass, and/or accelerometers to determine the orientation of the mobile device 302 and the display device 304 at any time. This allows the mobile device 302 to be placed at an arbitrary angle relative to the display device 304 as long as the mobile device camera 312 has a field of view that is overlapping and at some angle to that of the display device camera 316.

For example, if both the mobile device 302 and the display device 304 are equipped with a compass (electronic or analog) and a gyroscope, the viewing orientations can be synchronized based on the compass readings and the gyroscopes such that calibration by the user is unnecessary.

Also for example, if the display device 304 is equipped with a gyroscope or other sensors, the angle of the display device camera 316 can be determined and compensated for when determining the motion of the user's hand 308. As another example, a gyroscope in the mobile device 302 can determine when the mobile device 302 is in a face-down position and automatically initiate the wireless connection to the display device 304 and initialize the natural user interface system 300 without any further interaction from the user.

It has been discovered that having both the mobile device 302 and the display device 304 equipped with gyroscopes, compasses, and/or accelerometers allows for a better user experience. Because the orientation of the mobile device 302 and the display device 304 are known at any given time, the mobile device 302 can be placed in an arbitrary orientation relative to the display device 304, obviating the need for lengthy calibration procedures or limitations of how the mobile device 302 must be placed. In addition, automatic pairing based on the orientation of the mobile device 302 can also remove the need for the user to open or operate a specific program on the mobile device 302, further simplifying the user experience; all the user would need to do is to lay the phone in a face-down orientation in order to be able to use the natural user interface system 300.

Continuing the example, the posture and movements of the user's hand 308 as determined by the mobile device camera 312 and the display device camera 316 being positioned with their respective optical axes at angles to each other and overlapping can be translated into movement on the display screen 306 of a cursor. Relative movement of the user's hand 308 can be translated into movements of the cursor. As a specific example, the cursor can be set to not move or appear unless the user's hand is in a specific shape such as one finger pointing towards the screen. Specific points on the user's hand can be tracked separately with both the mobile device camera 312 and the display device camera 316 in order to determine movement in 3D space. Motion tracking to translate to movement on the display screen 306 of the cursor can also be done through vector mapping combined with a determination of distance between the mobile device 302 and the display device 304.

Continuing further with the example, the mobile device camera 312 has a view of the user's hand 308 with the ceiling as a background. This means that segmenting, thresholding, and otherwise determining the shape of the user's hand 308 is a simple process due to the generally clean ceiling background. The movements of the user's hand 308 on a forwards-backwards axis relative to the display screen 306 can be translated into the push of a button, for example. As another example, the flash light 314 of the mobile device 302 can be used to illuminate the user's hand 308 in low-light situations. The light used can be in the visible range, or can be in the infrared (IR) range for use without the risk of annoying the user with a bright light in the dark, for example.

It has been discovered that processing separate sets of images from the mobile device camera 312 and the display device camera 316 having their respective optical axes positioned at angles to each other and overlapping leads to faster and easier three-dimensional control of a natural user interface where the user's hand 308 is the main control input. For example, it is computationally much easier to determine that the user's hand 308 is pointing towards the display screen 306 from the bottoms up view of the mobile device camera 312 as compared to the display device camera 316 which only sees the user's hand 308 from the front. Splitting the components of determining movement among the separate but overlapping views allows only relevant data to be sent between the mobile device 302 and the display device 304, further lowering computational and bandwidth loading.

It has been discovered that wirelessly pairing the mobile device 302 and the display device 304 with the mobile device camera 312 and the display device camera 316 having their respective optical axes positioned at angles to each other allows the creation of a close-range user interface that can be easily set up and controlled through natural hand motions without specialized hardware. The mobile device camera 312 and the display device camera 316 can be simple 2D cameras without the complications of 3D or range camera hardware. The display device 304 can be anything from a TV to a laptop computer to a tablet, at least one of which a typical user will have, and the mobile device 302 can be a phone which just about anyone will have, so no additional hardware will need to be obtained by any user. Further, because the devices will synchronize orientation and can communicate relevant information between the mobile device 302 and the display device 304, no calibration by the user is necessary, easing set up and use of the natural user interface system 300.

Figure 4:
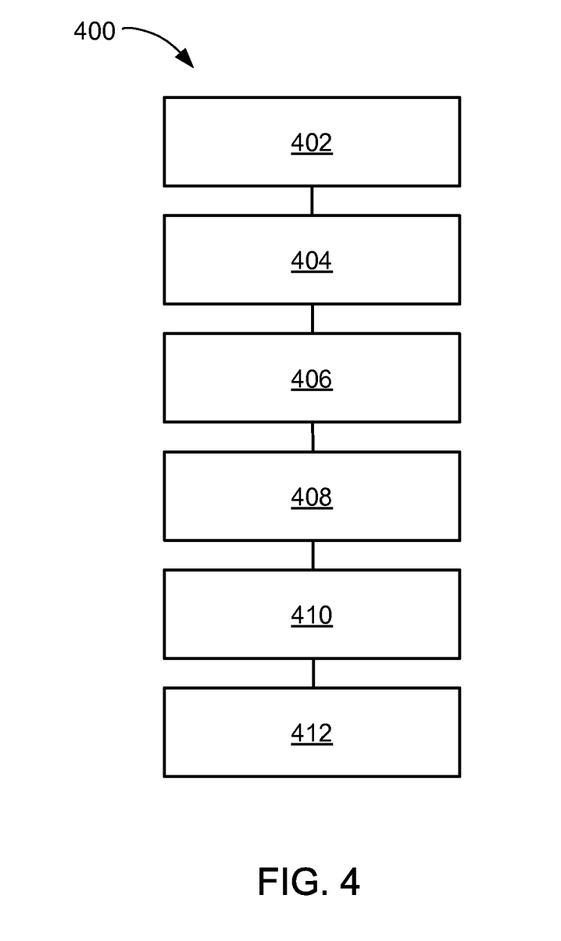
FIG. 4 is a flow chart of a method of operation of the natural user interface system in a further embodiment of the present invention.

Referring now to FIG. 4, therein is shown a flow chart of a method 400 of operation of the natural user interface system 100 in a further embodiment of the present invention. The method 400 includes: providing a display device having a display screen and a display device camera in a block 402; providing a mobile device having a mobile device camera, an optical axis of the mobile device camera positioned at an angle to an optical axis of the display device camera in a block 404; pairing the mobile device with the display device in a block 406; detecting a user's hand in a block 408; determining posture and movement of the user's hand in a block 410; and translating the posture and movement of the user's hand into a gesture for controlling an element of a user interface on the display screen in a block 412.

The resulting method, process, apparatus, device, product, and/or system is straightforward, cost-effective, uncomplicated, highly versatile and effective, can be surprisingly and unobviously implemented by adapting known technologies, and are thus readily suited for efficiently and economically manufacturing natural user interface systems/fully compatible with conventional manufacturing methods or processes and technologies.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a natural user interface system comprising:
   providing a display device having a display screen, a display device camera, a display device gyroscope, and a display device compass;
   providing a mobile device having a mobile device camera, a mobile device gyroscope, and a mobile device compass, an optical axis of the mobile device camera positioned at an angle to an optical axis of the display device camera;
   pairing the mobile device with the display device;
   determining an orientation of the display device with the display device gyroscope and the display device compass;
   determining an orientation of the mobile device with the mobile device gyroscope and the mobile device compass;
   synchronizing a viewing angle of the mobile device camera with the display device based on the orientation of the mobile device relative to the orientation of the display device;
   detecting a user's hand;
   determining posture and movement of the user's hand including:
      determining forwards-backwards motion and side-to-side motion of the user's hand with the mobile device camera, and
      determining up-and-down and side-to-side motion of the user's hand with the display device camera; and
   translating the posture and movement of the user's hand into a gesture for controlling an element of a user interface on the display screen.

2. The method as claimed in claim 1 further comprising rotating a viewing angle of the mobile device camera based on the orientation of the mobile device relative to the orientation of the display device.

3. The method as claimed in claim 1 further comprising:
   detecting a user's face;
   determining an eyeline vector from the user's face; and
   refining movement of a cursor on the display screen using the eyeline vector.

4. The method as claimed in claim 1 wherein detecting the user's hand includes:
   detecting the user's hand with the mobile device camera; and
   detecting the user's hand with the display device camera.

5. The method as claimed in claim 1 wherein determining the posture and movement of the user's hand includes:
   determining a posture of the user's hand with the mobile device camera and the display device camera; and
   determining the posture and movement of the user's hand in three dimensions by correlating motions of the user's hand as determined by the mobile device camera and the display device camera.

6. A method of operation of a natural user interface system comprising:
   providing a display device having a display screen, a display device camera, a display device gyroscope, and a display device compass;
   providing a mobile device having a mobile device camera, a mobile device gyroscope, and a mobile device compass, an optical axis of the mobile device camera positioned at an angle to an optical axis of the display device camera;
   pairing the mobile device with the display device;
   determining an orientation of the display device with the display device gyroscope and the display device compass;
   determining an orientation of the mobile device with the mobile device gyroscope and the mobile device compass;
   synchronizing a viewing angle of the mobile device camera based on the orientation of the mobile device relative to the orientation of the display device;
   detecting a user's hand with the mobile device camera and the display device camera;
   determining posture and movement of the user's hand including:

determining forwards-backwards motion and side-to-side motion of the user's hand with the mobile device camera, and determining up-and-down and side-to-side motion of the user's hand with the display device camera;

translating the posture and movement of the user's hand into a gesture for controlling an element of a user interface on the display screen;

detecting a user's face;

determining an eyeline vector from the user's face; and refining movement of a cursor on the display screen using the eyeline vector.

7. The method as claimed in claim 6 wherein detecting the user's hand with the mobile device camera includes:

determining a darkness condition; and activating a flash light of the mobile device for illuminating the user's hand based on the darkness condition, the flash light operating in the infrared range to avoid using visible light.

8. The method as claimed in claim 6 wherein pairing the mobile device with the display device includes:

determining a face-down orientation of the mobile device; and automatically initiating a wireless connection between the mobile device and the display device.

9. The method as claimed in claim 6 wherein providing the mobile device includes positioning the mobile device camera and the display device camera to have overlapping fields of view.

10. The method as claimed in claim 6 wherein detecting the user's hand with the mobile device camera includes detecting the user's hand against a ceiling as a background.

11. A natural user interface system comprising:

a display device having a display screen, a display device camera, a display device gyroscope, and a display device compass;

a mobile device having a mobile device camera, a mobile device gyroscope, and a mobile device compass, an optical axis of the mobile device camera positioned at an angle to an optical axis of the display device camera;

wherein:

the mobile device includes a first device pairing module for pairing the mobile device with the display device;

the display device gyroscope and the display device compass are for determining an orientation of the display device;

the mobile device gyroscope and the moment device compass are for determining an orientation of the mobile device;

the mobile device includes a view synchronization module for synchronizing a viewing angle of the mobile device camera with the display device based on the orientation of the mobile device relative to the orientation of the display device;

the mobile device camera and the display device camera are for:

detecting a user's hand, and determining posture and movement of the user's hand including:

determining forwards-backwards motion and side-to-side motion of the user's hand with the mobile device camera, and determining up-and-down and side-to-side motion of the user's hand with the display device camera; and the display device includes a motion translation module for translating the posture and movement of the user's hand into a gesture for controlling an element of a user interface on the display screen.

12. The system as claimed in claim 11 wherein the mobile device includes the view synchronization module for rotating a viewing angle of the mobile device camera based on the orientation of the mobile device relative to the orientation of the display device.

13. The system as claimed in claim 11 wherein:

the display device camera is for detecting a user's face; and the display device includes:

an eyeline detection module, coupled to the motion translation module, for determining an eyeline vector from the user's face, and a movement refinement module, coupled to the eyeline detection module, for refining movement of a cursor using the eyeline vector for display on the display screen.

14. The system as claimed in claim 11 further comprising a shape detection module, coupled to the first device pairing module, for detecting the user's hand with the mobile device camera.

15. The system as claimed in claim 11 wherein:

the display device is for determining the posture and movement of the user's hand in three dimensions by correlating motions of the user's hand as determined by the mobile device camera and the display device camera.

16. The system as claimed in claim 11 further comprising:

a shape detection module, coupled to the first device pairing module, for detecting the user's hand with the mobile device camera;

wherein:

the display device camera is for detecting a user's face; and the display device is for determining the posture and movement of the user's hand in three dimensions by correlating motions of the user's hand as determined by the mobile device camera and the display device camera, the display device including:

an eyeline detection module, coupled to the motion translation module, for determining an eyeline vector from the user's face, and a movement refinement module, coupled to the eyeline detection module, for refining the movement of the cursor using the eyeline vector for display on the display screen.

17. The system as claimed in claim 16 wherein:

the mobile device camera is for determining a darkness condition; and the mobile device includes a flash light for illuminating the user's hand based on the darkness condition, the flash light operating in the infrared range to avoid using visible light.

18. The system as claimed in claim 16 wherein:

the mobile device gyroscope is for determining a face-down orientation of the mobile device; and the first device pairing module is for automatically initiating a wireless connection between the mobile device and the display device.

19. The system as claimed in claim 16 wherein the optical axis of the mobile device camera positioned at an angle to the optical axis of the display device camera includes the mobile device camera and the display device camera having overlapping fields of view.

20. The system as claimed in claim 16 wherein the shape detection module is for detecting the user's hand against a ceiling as a background.

\* \* \* \* \*